United States Patent [19]

Reid et al.

[11] 4,360,171

[45] Nov. 23, 1982

[54] SEAT BELT RETRACTING AND LOCKING MECHANISM

[75] Inventors: Kenneth H. Reid, Mt. Clemens; Bernard J. Finn, Troy, both of Mich.

[73] Assignee: General Motors Corporation, Detroit, Mich.

[21] Appl. No.: 202,494

[22] Filed: Oct. 31, 1980

[51] Int. Cl.³ .................. A62B 35/02; B65H 75/48
[52] U.S. Cl. .................... 242/107.2; 280/806; 280/808; 188/65.1; 188/136
[58] Field of Search ............ 242/107.2, 107.4 R, 242/107.4 A; 280/806, 807, 808, 803; 297/478–480; 188/65.1, 67, 136, 139

[56] References Cited

U.S. PATENT DOCUMENTS

| | | | |
|---|---|---|---|
| 1,165,583 | 12/1915 | Farmer | 188/65.1 X |
| 2,403,653 | 7/1946 | Geohegan et al. | 242/107.2 X |
| 2,508,187 | 5/1950 | Niemiec | 188/65.1 X |
| 2,991,526 | 7/1961 | Kuebler | 188/65.1 X |
| 3,372,777 | 3/1968 | Filippi et al. | 188/136 |
| 3,439,932 | 4/1969 | Lewis et al. | 280/806 X |
| 3,711,154 | 1/1973 | Merola | |
| 4,093,042 | 6/1978 | Pradon | 188/67 |
| 4,195,795 | 4/1980 | Ardizio | 242/107.2 X |

FOREIGN PATENT DOCUMENTS 1061903  3/1967  United Kingdom .

Primary Examiner—John M. Jillions
Attorney, Agent, or Firm—Charles E. Leahy

[57] ABSTRACT

A seat belt retractor and locking mechanism includes a cable attached to the restraint belt and attached to a spring biased reel. A housing encircles the cable and encloses first and second collet members having aligned inner walls with mating recesses defining a cable passage therethrough and opposed-facing angularly-inclined outer walls. First and second rollers are interposed respectively between the housing and the inclined outer walls of the collet members. A pair of spring clips acting between the collet members and an adjustable support plate for the rollers cooperate to establish a normal spaced apart position of the collet members in which the cable passes freely through the cable passage during belt extension and retraction induced by winding and unwinding of the cable from the reel. A pendulum sensitive to a predetermined magnitude of vehicle deceleration is effective to initiate axial movement of the collet members so that the rollers coact with the inclined outer walls to contract the collet members into gripping engagement with the cable. The forward momentum of the occupant imparts a load on the restraint belt and cable so that the coaction between the rollers and the inclined outer walls cause the cable to be progressively gripped to thereby lock the effective length of the restraint belt.

1 Claim, 3 Drawing Figures

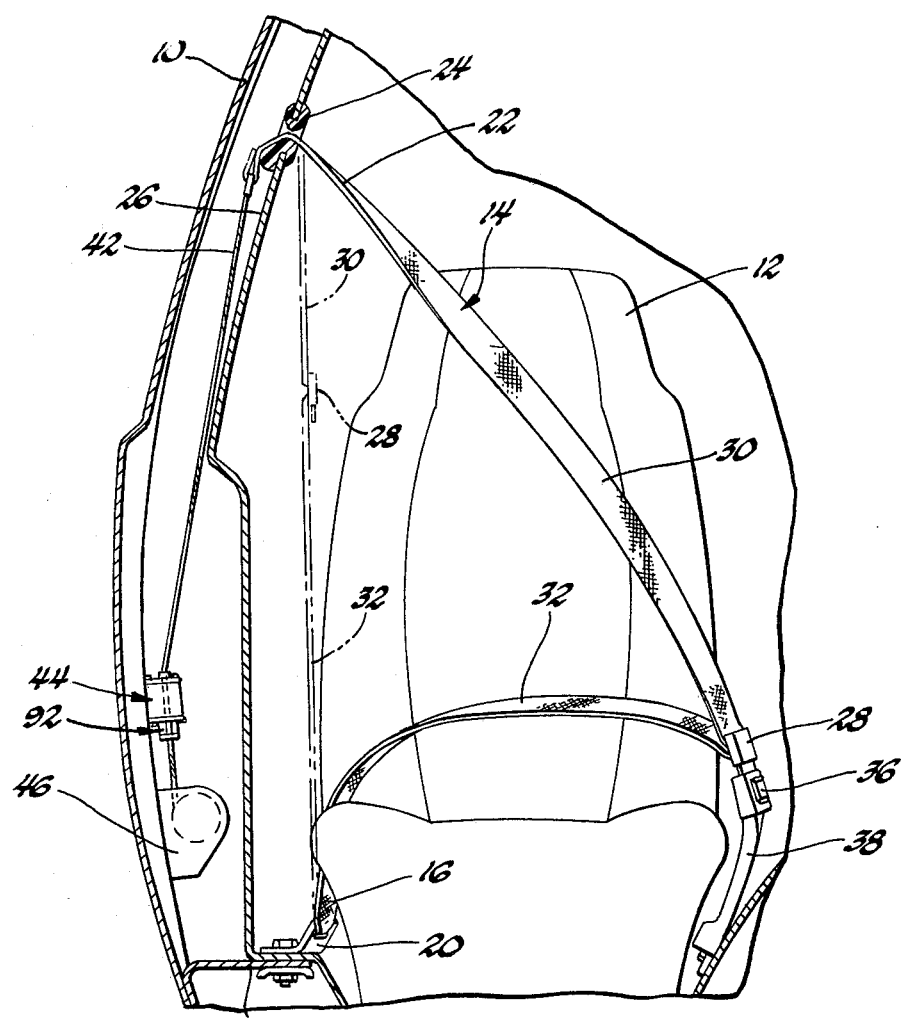
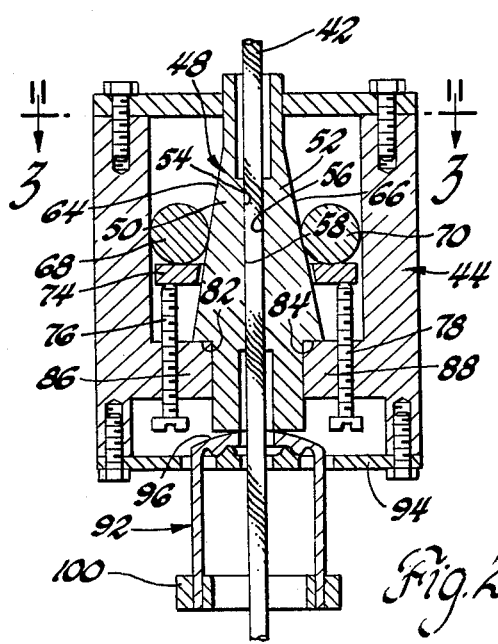
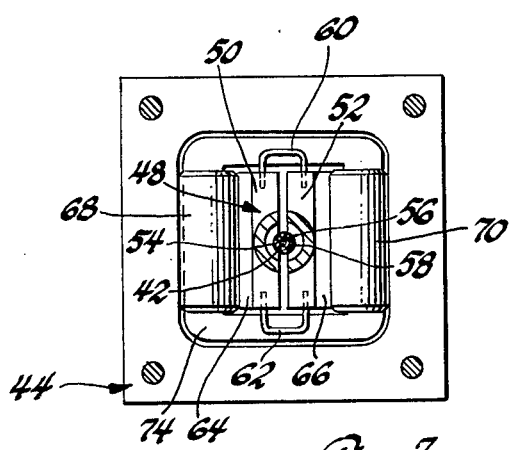

SEAT BELT RETRACTING AND LOCKING MECHANISM

The invention relates to a seat belt retractor and more particularly to a vehicle deceleration sensitive mechanism for gripping a cable attached to the end of the restraint belt.

BACKGROUND OF THE INVENTION

It is well known to provide a restraint belt for restraining a vehicle occupant upon a vehicle seat. It is also well known to provide a retractor having a spring biased reel to which one end of the restraint belt is attached to wind and unwind the belt for movement between restraining and stored positions. It is also well known to provide a deceleration sensitive locking mechanism for fixing the length of the belt against extension from the retractor reel when the restraint belt is established in the restraining position.

The present invention provides a new and improved retracting mechanism for extending and retracting a belt and locking the belt at a fixed length in response to the sensing of a predetermined magnitude of vehicle deceleration.

SUMMARY OF THE INVENTION

According to the invention, a cable is attached to the restraint belt and passes through a housing attached to the vehicle body and is wound by a spring biased reel. The housing encloses first and second collet members having aligned recesses defining a cable passage therethrough and opposed-facing angularly-inclined outer walls. First and second rollers are interposed respectively between the housing and the inclined outer walls of the collet members. A pair of spring clips acting between the collet members and an adjustable support plate for the rollers cooperate to establish a normal spaced-apart position of the collet members in which the cable passes freely through the cable passage during belt extension and retraction induced by winding and unwinding of the cable from the reel. A pendulum sensitive to a predetermined magnitude of vehicle deceleration is effective to initiate axial movement of the collet members so that the rollers coact with the inclined outer walls to contract the collet members into gripping engagement with the cable. The forward momentum of the occupant imparts a load on the restraint belt and cable so that the coaction between the rollers and the inclined outer walls causes the cable to be progressively gripped to thereby lock the effective length of the restraint belt.

BRIEF DESCRIPTION OF THE DRAWINGS

These and other objects, features and advantages of the invention will become more apparent upon consideration of the specification and the appended drawings in which:

FIG. 1 is a sectional view of the vehicle body having a seat belt retracting and locking mechanism according to the invention;

FIG. 2 is an enlarged fragmentary sectional view of the seat belt locking mechanism; and FIG. 3 is a sectional view taken in the direction of the arrows II—II of FIG. 2.

Referring to FIG. 1, there is shown a motor vehicle body 10 in which an occupant seat 12 is conventionally mounted. A restraint belt system for restraining an occupant in the seat 12 includes a continuous-loop belt 14 having a lower end 16 attached to the sill structure 18 of the vehicle body by a mounting bracket 20. The upper end 22 of the belt passes through a guide plate 24 mounted on the pillar structure 26 of the vehicle body. A latch plate 28 is slidable along the continuous-loop belt 14 and divides the belt 14 into a shoulder belt 30 and a lap belt 32 when the latch plate 28 is engaged within a bucket 36 mounted inboard the seat by a mounting strap 38.

The upper end 22 of the belt is attached to a cable 42. The cable 42 passes through a housing 44 mounted on the pillar structure 26 and has its end suitably attached to a spring biased reel assembly generally indicated at 46. The reel assembly 46 winds the cable 42 when the latch plate 28 is released from the buckle 36 to retract the belt 14 to the phantom line indicated stowed position of FIG. 1.

Referring to FIGS. 2 and 3, it is seen that the housing 44 encloses a mechanism for gripping the cable to thereby fix the effective length of the belt 14 upon occurrence of a vehicle deceleration condition. As best seen in FIG. 2, the housing 44 encloses a collet assembly 48 comprised of first and second collet members 50 and 52 having inner walls with aligned arcuate recesses 54 and 56 therethrough cooperating to define a passage 58 through which the cable 42 passes. A pair of spring clips 60 and 62 have their ends anchored to the collet members 50 and 52 to establish normal positions thereof in which the collet members inner walls defining the recesses 54 and 56 are slightly spaced from the cable 42 to permit passage of the cable 42 through the housing 44.

The collet members 50 and 52 have opposed facing angularly inclined outer walls 64 and 66. A pair of rollers 68 and 70 are respectively interposed between the inclined outer walls 64 and 66 and the adjacent inner wall of the housing 44. The rollers 68 and 70 are established at the normal position of FIG. 2 by a support plate 74 which is adjustably mounted by a pair of adjusting screws 76 and 78. The collet members 50 and 52 are established at their normal position of FIG. 2 by abutment surfaces 82 and 84 thereof which rest upon wall portions 86 and 88 of the housing 44. As seen in FIG. 2, the adjusting screws 76 and 78 are adjusted to establish the roller 68 and 70 at an axial position within the housing 44 at which the rollers will simultaneously contact the inner walls of the housing 44 and the inclined outer walls 64 and 66 at their normal spaced apart position established by the spring clips 60 and 62 so that the cable 42 may pass the cable passage 58.

Referring again to FIG. 2, it is seen that a pendulum assembly 92 is suspended from a plate 94 attached to the housing 44. The pendulum assembly 92 includes a spherical actuating portion 96 which engages the lower end walls of collet members 50 and 52. Pendulum assembly 92 also has a pendulum weight 100 which upsets the pendulum assembly 92 upon occurrence of a vehicle deceleration of predetermined magnitude.

The occurrence of a vehicle deceleration condition of predetermined magnitude causes the pendulum 92 to tilt so that the spherical actuating portion 96 of the pendulum 92 rocks upwardly and thereby induces limited axially upward movement of the collet members 50 and 52. The upward movement of the collet members 50 and 52 causes the rollers 68 and 70 to coact with the inclined outer walls 64 and 66 to contract the collet members 50 and 52 toward one another and thereby grip the cable 42. Forward momentum of the vehicle occupant during vehicle deceleration induces an occupant restraint load on the belt 14 which is transferred to the cable 42. Accordingly, the cable 42 is moved in the belt extending direction and induces further axially upward movement of the collet members 50 and 52. The rollers 68 and 70 coact with the inclined outer walls 64 and 66 to induce progressively greater gripping of the cable 42 and concomitantly prevent axial movement of the collet members 50 and 52 relative the housing 44 so that the cable 42 is effectively locked against passage through the housing 44. Accordingly, it will be understood that the belt 14 is held against extension so that the occupant is restrained in the occupant seat 12.

When the occupant restraint load is relieved from the belt 14, the load is removed from the cable 42 so that the spring clips 60 and 62 and the wind-up efforts of the cable reel 46 are permitted to restore the collet members 50 and 52 to their normal position of FIGS. 2 and 3 in which the cable 42 is ungripped for winding and unwinding movement.

Thus, it is seen that the invention provides a new and improved seat belt retracting and locking mechanism.

While the invention has been disclosed herein primarily in terms of specific embodiment shown in the drawing, it is not intended to be limited thereto, but rather only to the extent set forth in the appended claims. The collet members for gripping the cable are not limited to the particular form shown in the drawings.

For example, the collet assembly may be comprised of three or more segments which contract radially to grip the cable more uniformly about its circumference. Furthermore, the function of the rollers coacting with the collet members could be provided by a plurality of balls or by wedge-shaped members. Instead of having two separate collet members 50 and 52 positioned by spring clips 60 and 62, the collet assembly may be comprised of a single piece of tempered steel having a central drilled recess and two or more longitudinal extending radial slits by which the collet could be radially contracted to grip the cable 42. The temper of the steel would release the grip on the cable without need for spring clips.

The embodiments of the invention in which an exclusive property or privilege is claimed are defined as follows:

1. A restraint belt retracting mechanism comprising:
   a cable attached to the end of the restraint belt;
   a spring biased reel mounted on the vehicle body and adapted to extend and retract the belt by winding and unwinding the cable;
   a housing mounted on the vehicle body and having the cable passing therethrough;
   a radially contractable collet having an axially extending cable passage therethrough defined by passage walls normally spaced from the cable to permit cable passage therethrough during belt extension and retraction, said collet having opposed facing angularly inclined outer walls facing the housing;
   first and second rollers interposed between the housing and the collet outer walls;
   adjusting screw means threadably engaging the housing and effective to adjust the position of the first and second rollers relative the angularly inclined outer walls on the collet;
   inertia sensing means responsive to vehicle deceleration adapted to effect relative axial movement of the collet relative the first and second rollers whereby the rollers coact with the outer walls to radially contract the collet to grip the cable; and
   the imposition of occupant restraint load on the cable inducing cable and collet movement relative the first and second rollers whereby the collet is progressively contracted to progressively grip the cable against movement in the belt extending direction.

* * * * *